United States Patent [19]

Delmastro

[11] Patent Number: 4,661,030
[45] Date of Patent: Apr. 28, 1987

[54] ADJUSTABLE FASTENER FOR BUMPER BAR

[75] Inventor: John A. Delmastro, Romeo, Mich.

[73] Assignee: General Motors Corporation, Detroit, Mich.

[21] Appl. No.: 842,354

[22] Filed: Mar. 18, 1986

Related U.S. Application Data

[63] Continuation of Ser. No. 555,495, Nov. 28, 1983, abandoned.

[51] Int. Cl.⁴ ............................................. F16B 39/10
[52] U.S. Cl. ..................................... 411/85; 411/116; 411/552
[58] Field of Search .................. 411/116, 401, 85, 84, 411/378, 349, 552, 103–107, 112, 352; 24/590, 591, 596, 651, 663

[56] References Cited

U.S. PATENT DOCUMENTS

| 76,995 | 4/1868 | Christy | 411/116 |
|---|---|---|---|
| 592,896 | 11/1897 | White | 411/116 |
| 1,985,333 | 12/1934 | Wiley | 411/107 |
| 2,696,139 | 12/1954 | Attwood | 411/427 |
| 2,883,011 | 4/1959 | Flora | 411/116 X |
| 3,321,243 | 5/1967 | Ferrara | 411/116 X |
| 3,456,706 | 7/1969 | Ollis | 411/84 |
| 3,508,306 | 4/1970 | Wright | 24/221 |
| 3,804,140 | 4/1974 | Harper | 411/116 |
| 4,146,074 | 3/1979 | Kowalski | 411/111 |
| 4,285,379 | 8/1981 | Kowalski | 411/85 |

FOREIGN PATENT DOCUMENTS

| 1081402 | 12/1954 | France | 24/591 |
|---|---|---|---|
| 353731 | 10/1937 | Italy | 411/349 |
| 29749 | of 1915 | United Kingdom | 411/401 |
| 1027931 | 4/1966 | United Kingdom | 411/116 |
| 1069702 | 5/1967 | United Kingdom | 411/401 |
| 1142142 | 2/1969 | United Kingdom | 411/349 |
| 579463 | 11/1977 | U.S.S.R. | 411/401 |

Primary Examiner—Gary L. Smith
Assistant Examiner—Adrian H. Whitcomb, Jr.
Attorney, Agent, or Firm—Charles E. Leahy

[57] ABSTRACT

A bumper bar comprised of joined together stampings defining a closed box section has a cage attached inside the bumper bar and overlying an elongated opening in the bumper bar. The elongated opening has a major dimension which extends in the direction of desired adjusting movement of the bumper bar relative to the structural member upon which bumper bar is to be mounted. A bolt has a bolt head at least sufficiently smaller than the elongated opening to permit axial insertion of the bolt head through the elongated opening. The bolt head has a major dimension greater than the minor dimension of the elongated opening so that a quarter-turn rotation of the bolt subsequent to insertion through the elongated opening will align the major dimension of the head for engagement with the bumper bar to prevent removal of the bolt from the elongated opening. The cage has a pair of spring tangs struck therefrom and engaged by the bolt head to yield axially upon insertion of the bolt head in the elongated opening and then urge the bolt head axially into enagagement with the bumper bar and also urge the bolt laterally of the bumper bar to a predetermined initial position within the range of lateral adjusting movement provided by the elongated opening to facilitate the alignment of the bolt with the vehicle structural member.

1 Claim, 4 Drawing Figures

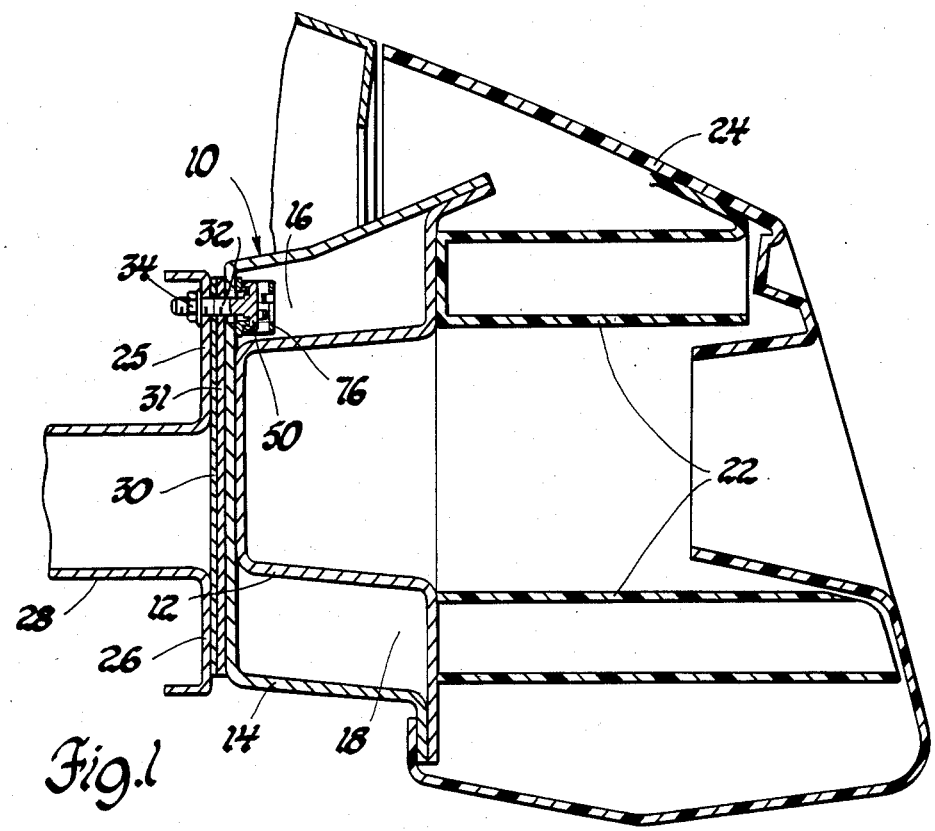

ADJUSTABLE FASTENER FOR BUMPER BAR

This is a continuation of co-pending application Ser No. 555,495 filed on Nov. 28, 1983 now abandoned.

The invention relates to a bumper bar attachment for a motor vehicle and more particularly provides a fastener for insertion into a blind hole in a closed box section of the bumper bar and which permits adjusting movement of the bumper bar on the vehicle.

BACKGROUND OF THE INVENTION

Vehicle body structures such as bumper impact bars are typically constructed by welding or otherwise joining together a pair of stampings to define a closed box section. The bumper impact bar is subsequently mounted on the ends of the vehicle frame or equivalent mounting structure.

Heretofore, it has been known to provide studs welded to the outer face of the closed box section in order to effect the attachment of the closed box section to the vehicle frame. However, it will be appreciated that the weld studs may be subject to damage during handling of the impact bars subsequent to their manufacture but prior to being mounted upon the vehicle frame. Furthermore, it will be appreciated that the location of the weld stud is fixed by the welding operation and the weld stud cannot adjust relative to the impact bar as may be desired to facilitate the assembly of the impact bar to the vehicle frame or to enable adjustment of the impact bar relative to the vehicle frame.

It is also well known to employ a cage for temporarily retaining a fastener in registering alignment with an oversized hole so that a fastener can be moved within the confines of the cage to a desired adjusted position. In the case of a closed box section such as a bumper bar, the cage and fastener would be installed upon one of the stampings comprising the closed box section prior to joining the stampings together. Accordingly, in those instances where the fastener is a threaded bolt, the bolt would project from the closed box section and would be subject to damage during in-plant handling.

The present invention provides a new and improved fastening system for a closed box section.

SUMMARY OF THE INVENTION

According to the invention a bumper bar comprised of joined together stampings defining a closed box section has a cage attached inside the bumper bar and overlying an elongated opening in the bumper bar. The elongated opening has a major dimension which extends in the direction of desired adjusting movement of the bumper bar relative to the structural member upon which bumper bar is to be mounted. A bolt has a bolt head at least sufficiently smaller than the elongated opening to permit axial insertion of the bolt head through the elongated opening. The bolt head has a major dimension greater than the minor dimension of the elongated opening so that a quarter-turn rotation of the bolt subsequent to insertion through the elongated opening will align the major dimension of the head for engagement with the bumper bar to prevent removal of the bolt from the elongated opening. The cage has a pair of spring tangs struck therefrom and engaged by the bolt head to yield axially upon insertion of the bolt head in the elongated opening and then urge the bolt head axially into engagement with the bumper bar and also urge the bolt laterally of the bumper bar to a predetermined initial position within the range of lateral adjusting movement provided by the elongated opening to facilitate the alignment of the bolt with the vehicle structural member.

Accordingly, the object, feature and advantage of the present invention resides in the provision of a cage mounted in overlying relationship with an elongated opening in a closed box section and having integral spring tangs struck therefrom and bearing axially upon insertion of an elongated bolt head through the opening and quarter-turn bolt rotation to urge the bolt head axially into engagement with the bumper bar and also urge the bolt laterally of the bumper bar to a predetermined initial position within the range of lateral adjusting movement to facilitate alignment of the bolt with the structural member.

DESCRIPTION OF THE DRAWINGS

These and other objects, features and advantages of the invention will become apparent upon consideration of the specification and the appended drawing in which:

FIG. 1 is a sectional view taken through the front bumper structure of the vehicle body and showing the closed box section bumper impact bar attached to the vehicle frame by the fastening system of this invention;

FIG. 2 is an enlarged fragmentary view showing the insertion of the headed bolt into the cage mounted inside the closed box section;

FIG. 3 is a view similar to FIG. 2 but showing the initial lateral adjusted position of the fastener established by the integral spring tangs of the cage and having a phantom line representation of the permitted range of lateral adjustment of the bolt; and FIG. 4 is a sectional view taken in the direction of arrows 4—4 of FIG. 3.

DESCRIPTION OF THE PREFERRED EMBODIMENT

According to FIG. 1 there is shown a front end bumper structure of a vehicle body. A bumper impact bar 10 is comprised of an inner sheet metal stamped channel 12 and an outer sheet metal stamped channel 14 which are suitably welded or adhesively bonded together to define a closed box section having cavities 16 and 18. The bumper impact bar 10 mounts a molded plastic energy absorbing structure 22 which is enclosed by a plastic fascia 24.

The bumper bar 10 is attached to flanges 25 and 26 of the frame 28. Shims 30 and 31 are interposed between the bumper impact bar 10 and the frame 28. Bumper impact bar 10 is attached to the frame 28 by a plurality of nut and bolt assemblies, one such assembly being shown and designated as bolt 32 and nut 34.

Referring to FIG. 2, it is seen that the outer channel 14 of the impact bar 10 has an elongated rectangular opening 38 which communicates with the cavity 16 of the closed box section. The major dimension of the rectangular opening 38 extends laterally of the vehicle between end walls 40 and 42. The minor dimension of the rectangular opening 38, as seen in FIG. 4, extends between upper wall 44 and lower wall 46. The bolt 32 has an elongated bolt head 50 which is sufficiently smaller than the rectangular opening 38 to permit its insertion therethrough. More particularly, as seen in FIG. 2, the major dimension of the bolt head 50 is defined by wing flanges 52 and 54 which project axially from the bolt head 50 parallel with the shank of the bolt 32. The minor dimension of the bolt head 50 as shown in FIG. 3, is defined by edge faces 56 and 57. The distance between the edge faces 56 and 57 is slightly less than the distance between upper wall 44 and lower wall 46 of the rectangular opening 38 in the bumper impact bar 10. Accordingly, as best seen by reference to FIG. 2, the bolt 32 may be inserted through the rectangular opening 38 by aligning the major dimension of the bolt head 50 with the major dimension of the rectangular opening 38. Then, a quarter turn rotation of the bolt 32 to the position of FIGS. 3 and 4 will align major dimension of the bolt head 50 with the minor dimension of the rectangular opening 38 so that the wings 52 and 54 of the bolt head 50 overlie the outer channel 14 of the impact bar adjacent to the upper and lower walls 44 and 46 of the rectangular opening 38.

As best seen in FIG. 4, the wings 52 and 54 of the bolt head 50 interact with a flanged plate 58 to maintain the bolt 32 at the quarter-turn rotational orientation of FIGS. 3 and 4. More particularly, as best seen in FIGS. 2, 3 and 4, the flanged plate 58 is rectangular in shape and attached to the outer channel 14 of the impact bar 10 by a pair of rivets 62 and 64. The flanged plate 58 has a rectangular opening 66 which registers with the rectangular opening 38 of the impact bar 10. As best seen in FIG. 4, the material struck from the flanged plate 58 to define the opening 66 is turned inwardly to define flanges 70 and 72 which extend parallel along the major dimension of the rectangular opening. As best seen in FIG. 4, the wing flanges 52 and 54 of the bolt head 50 respectively straddle the flanges 70 and 72 of the flanged plate 58 to lock the bolt 32 against quarter-turn rotation which would enable withdrawal of bolt 32 from closed box section of the bumper bar 10.

It is also seen in FIGS. 2, 3 and 4 that a cage 76 of stamped spring steel is attached to the impact bar 10 by the rivets 62 and 64 and overlies the elongated opening 38. The cage 76 has a rear wall 77 spaced away from the outer channel 14 and having a pair of spring tangs 78 and 80 struck therefrom and yieldably extending into engagement with the corners of the head 50 of the bolt 32. As best seen in FIG. 2, upon insertion of the bolt 32 through the elongated opening 38, the head 50 engages against the spring tangs which yield to permit the insertion of the bolt. A subsequent quarter-turn rotation of the bolt 32 to the rotary position of FIGS. 3 and 4 enables the spring tangs 78 and 80 to urge the bolt 32 axially outwardly to the position of FIG. 4 in which the wing flanges 52 and 54 of the bolt head 50 straddle the flanges 70 and 72 of the flanged plate 58. Accordingly, the spring tangs 78 and 80 are seen to provide a constant axial thrust against the bolt 32 which maintains the bolt head 50 in engagement with the flanged plate 58 so that the bolt 32 cannot be further rotated to permit its removal from the bumper bar 10.

As best seen in FIG. 3, the spring tangs 78 and 80 also function to establish the bolt 32 at a predetermined central location within the elongated opening 38. More particularly, the spring tang 80 urges the bolt 32 toward the end wall 42 of the elongated opening 38 while the spring tang 78 urges the bolt head 50 in the opposite direction toward the end wall 40.

In summary then it is understood that the flanged plate 58 and the cage 76 are attached to the outer channel 14 of the impact bar 10 by rivets 62 and 64. The inner and outer channels 12 and 14 are then joined together by welding or adhesive to define a closed box section cavity 16. Accordingly, the impact bar 10 may be shipped or handled without concern for damage as there are no bolts attached thereto.

In the automobile assembly plant, the bolt 32 is inserted through the rectangular opening 38 as best shown in FIG. 2. Upon such insertion, spring tangs 78 and 80 of the cage 76 are collapsed. The bolt 32 is then rotated the quarter-turn to the position of FIGS. 3 and 4 in which the major dimension of bolt head 50 as defined by its wings 52 and 54 exceeds the height of the elongated opening 38 defined between its upper wall 44 and lower wall 46. The spring tangs 78 and 80 urge the bolt head 50 axially to the positions of FIGS. 3 and 4 in which the wing flanges 52 and 54 straddle flanges 70 and 72 of the flange plate 58 to prevent a further quarter-turn rotation of the bolt 32 which would enable its withdrawal from the closed box section cavity 16. However, the wing flanges 52 and 54 are permitted to slide along the flanges 70 and 72 of the flange plate 58 to permit adjustment of the bolt 32 within the elongated opening.

Furthermore, as best seen in FIG. 3, the relative angular projecting orientation of the spring tangs 78 and 80 cause them to respectively engage with the opposed edge faces 57 and 56 of the bolt head 50 in a manner to urge and maintain the bolt 32 at its central location within the elongated opening 38 as shown in FIG. 3.

It will be understood that a plurality of the fasteners as shown in FIGS. 2, 3 and 4 are provided on the bumper impact bar 10. In each case the bolt 32 is held at its position centrally of the elongated opening 38 so as to facilitate aligning the plurality of bolts 32 with the plurality of matched openings in the flanges 25 and 26 of the vehicle frame 28. Then, after the bolts 32 are inserted through the matched openings in the flanges 25 and 26, the impact bumper 10 can be adjusted laterally of the vehicle and the nuts 34 installed thereon.

Thus, it is seen that the fastening system of this invention enables the bolt to be installed into the bumper just prior to the assembly of the bumper on the car so that the bolts do not become damaged such as by battering of the threads during handling in the plant. Furthermore, it will be seen that the fastening system of this invention provides a unique cage for a floating bolt, which cage functions to yieldably establish the bolt at a centered position to facilitate subsequent installation of the bolt through a matching hole in the vehicle frame. Furthermore, the integral spring of the flange urges the bolt head axially in engagement with an antirotation flange so that the bolt will not be inadvertently rotated in a quarter-turn and be dropped from the bumper.

The embodiments of the invention in which an exclusive property or privilege is claimed are defined as follows:

1. A fastener system for adjustably mounting a closed box section bumper bar or the like on a structural member comprising:

an elongated opening in the bumper bar, said elongated opening having a major dimension defining the limit of lateral adjusting movement of the bumper bar relative to the structural member and a minor dimension;

a bolt having a bolt head smaller than the elongated opening to permit axial insertion of the bolt head through the elongated opening and having a major dimension greater than the minor dimension of the elongated opening so that quarter-turn rotation of the bolt subsequent to insertion through the elongated opening aligns the major dimension of the bolt head for overlying relationship with the bumper bar to prevent removal of the bolt from the bumper bar, said bolt head having opposed edge faces defining the minor dimension thereof; and a cage attached to the bumper bar inside the closed box section for retaining the bolt in the elongated opening, said cage having a wall overlying the elongated opening and having first and second integral spring tangs struck from the overlying wall and projecting at a relative angular orientation into engagement with the bolt head to yield axially upon insertion of the bolt head into the opening and urge the bolt head axially into engagement with the bumper bar, said first and second integral spring tangs further engaging with corners of the opposed edge faces of the bolt head subsequent to quarter-turn rotation of the bolt head and acting to impose opposed acting forces on the opposed edge faces of the bolt head to urge movement of the bolt laterally of the bumper bar to a predetermined central initial position within the range of lateral adjusting movement to facilitate alignment of the bolt with the structural member, and said first and second spring tangs engaging with corners of the oppsed edge faces of the bolt head being yieldable to permit lateral adjusting movement of the bolt from the predetermined central initial position to an adjusted position within the range of lateral adjusting movement of the bumper bar defined by the elongated opening.

* * * * *